US011835000B2

(12) United States Patent
Pascu et al.

(10) Patent No.: US 11,835,000 B2
(45) Date of Patent: Dec. 5, 2023

(54) METHODS AND SYSTEMS FOR A MODULATED BLEED VALVE

(71) Applicant: United Technologies Corporation, Hartford, CT (US)

(72) Inventors: Victor Pascu, San Diego, CA (US); Anthony C. Jones, San Diego, CA (US)

(73) Assignee: RTX Corporation, Farmington, CT (US)

( * ) Notice: Subject to any disclaimer, the term of this patent is extended or adjusted under 35 U.S.C. 154(b) by 1793 days.

(21) Appl. No.: 14/972,289

(22) Filed: Dec. 17, 2015

(65) Prior Publication Data

US 2021/0131352 A1    May 6, 2021

(51) Int. Cl.
*F02C 9/00*    (2006.01)
*F02C 9/18*    (2006.01)
(Continued)

(52) U.S. Cl.
CPC .............. *F02C 9/18* (2013.01); *F01D 17/145* (2013.01); *F02C 6/08* (2013.01); *F05D 2220/323* (2013.01); *F05D 2240/128* (2013.01); *F05D 2240/35* (2013.01); *F05D 2260/232* (2013.01); *F05D 2270/101* (2013.01)

(58) Field of Classification Search
CPC ...... F02C 9/18; F02C 6/08; F02C 7/18; F04D 27/02; F04D 27/0215; F04D 27/0238; F05D 2270/101; F01D 17/105; F01D 25/12
See application file for complete search history.

(56) References Cited

U.S. PATENT DOCUMENTS 5,022,817 A * 6/1991 O'Halloran ............... F01D 5/18
                                                    415/115
5,394,687 A * 3/1995 Chen ......................... F01D 9/02
                                                    60/785
(Continued)

FOREIGN PATENT DOCUMENTS

EP          2685067        1/2014
WO       2014134134        9/2014

OTHER PUBLICATIONS

European Patent Office, European Office Action dated Oct. 2, 2018 in Application No. 16204844.1-1007.
(Continued)

*Primary Examiner* — Edwin Kang
(74) *Attorney, Agent, or Firm* — Snell & Wilmer L.L.P.

(57) ABSTRACT

Methods and systems for a gas turbine engine comprising a modulated bleed valve are provided. The gas turbine engine may comprise a turbine nozzle coupled to a controller, a modulated bleed valve in communication with the controller, and a tangible, non-transitory memory providing instructions to the controller to perform operations. The operations may include receiving parameter values from the parameter sensor at various times, determining desired bleed airflows to flow through the modulated bleed valve at various times, and/or commanding the modulated bleed valve to assume an open configuration or a closed configuration at various times. The modulated bleed valve may be configured to allow bleed airflow to bypass a nozzle choke area of the turbine nozzle and join a nozzle airflow.

8 Claims, 6 Drawing Sheets

(51) Int. Cl.
*F01D 17/14* (2006.01)
*F02C 6/08* (2006.01)

(56) References Cited

U.S. PATENT DOCUMENTS

| | | | | |
|---|---|---|---|---|
| 6,695,578 | B2* | 2/2004 | Winslow | F01D 17/105 |
| | | | | 137/625.38 |
| 2009/0311090 | A1* | 12/2009 | Schilling | F01D 5/187 |
| | | | | 415/115 |
| 2013/0192250 | A1 | 8/2013 | Glahn et al. | |
| 2014/0072399 | A1* | 3/2014 | Maldonado | F01D 25/10 |
| | | | | 415/1 |
| 2014/0260280 | A1* | 9/2014 | Willis | F01D 9/023 |
| | | | | 60/752 |
| 2014/0271115 | A1* | 9/2014 | Duge | F01D 5/18 |
| | | | | 415/1 |
| 2015/0354464 | A1* | 12/2015 | Hillel | F02C 3/04 |
| | | | | 415/1 |

OTHER PUBLICATIONS

European Patent Office, European Search Report dated May 14, 2017 in Application No. 16204844.1.

\* cited by examiner

METHODS AND SYSTEMS FOR A MODULATED BLEED VALVE

FIELD OF THE INVENTION

The present disclosure relates generally to gas turbine engines. More particularly, the present disclosure relates to bleed valves in gas turbine engines.

BACKGROUND

Gas turbine engines typically comprise a turbine nozzle that allows a fixed amount of air through a nozzle choke area. Allowing some air to bypass the nozzle choke area through a bleed valve may be beneficial for reducing pressure in the gas turbine engine.

SUMMARY OF THE INVENTION

A gas turbine engine may comprise a turbine nozzle coupled to a combustor, the turbine nozzle comprising a nozzle choke area, and a modulated bleed valve in communication with a controller. The modulated bleed valve may be configured to assume, in response to a command by the controller, at least one of an open configuration, a partially open configuration ranging anywhere between 0% open and 100% open, or a closed configuration to allow a bleed airflow through the turbine nozzle aft of the nozzle choke area. When in the open configuration or a partially open configuration, the modulated bleed valve may reroute bleed airflow forward to join nozzle airflow at a point aft of the nozzle choke area. In various embodiments, the modulated bleed valve may produce no audible emissions. The modulated bleed valve may be disposed aft of the nozzle choke area. When in a closed configuration, the modulated bleed valve may be 0% open and prevent bleed airflow from flowing through the turbine nozzle. The modulated bleed valve may comprise a valve actuator configured to move the modulated bleed valve into at least one of the open configuration, the partially open configuration, or the closed configuration in response to the command by the controller. The bleed airflow and the nozzle airflow may be used to cool the turbine nozzle and/or rotate a high pressure turbine. When in the open configuration or the partially open configuration, the modulated bleed valve may increase the nozzle airflow by 3% to 5% by adding bleed airflow to it. The high pressure compressor surge margin may increase by greater than 5%.

In various embodiments, the gas turbine engine may comprise a tangible, non-transitory memory providing instructions to the controller to perform operations. An article of manufacture comprising a tangible, non-transitory memory may also provide instructions to a controller to perform operations. The operations performed by the controller may comprise receiving parameter values from a parameter sensor at various times during an aircraft flight, determining desired bleed airflows to flow through the modulated bleed valve at various times during an aircraft flight, and/or commanding the modulated bleed valve to assume at least one of an open configuration, a partially open configuration ranging anywhere between 0% open and 100% open, or a closed configuration at various times during an aircraft flight. When in the open configuration or a partially open configuration, the modulated bleed valve may reroute bleed airflow forward to join nozzle airflow at a point aft of the nozzle choke area.

A method of varying bleed airflow in a gas turbine engine may comprise receiving parameter values from a parameter sensor at various times during an aircraft flight, determining desired bleed airflows to flow through the modulated bleed valve at various times during an aircraft flight, and/or commanding the modulated bleed valve to assume at least one of an open configuration, a partially open configuration ranging anywhere between 0% open and 100% open, or a closed configuration at various times during an aircraft flight. When in the open configuration or a partially open configuration, the modulated bleed valve may reroute bleed airflow forward to join nozzle airflow at a point aft of the nozzle choke area. The bleed airflow may be used to cool a turbine nozzle and/or rotate a high pressure turbine. In various embodiments, the method may comprise moving, by a valve actuator, the modulated bleed valve into the open configuration, a partially open configuration, and/or the closed configuration, at various times during an aircraft flight.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
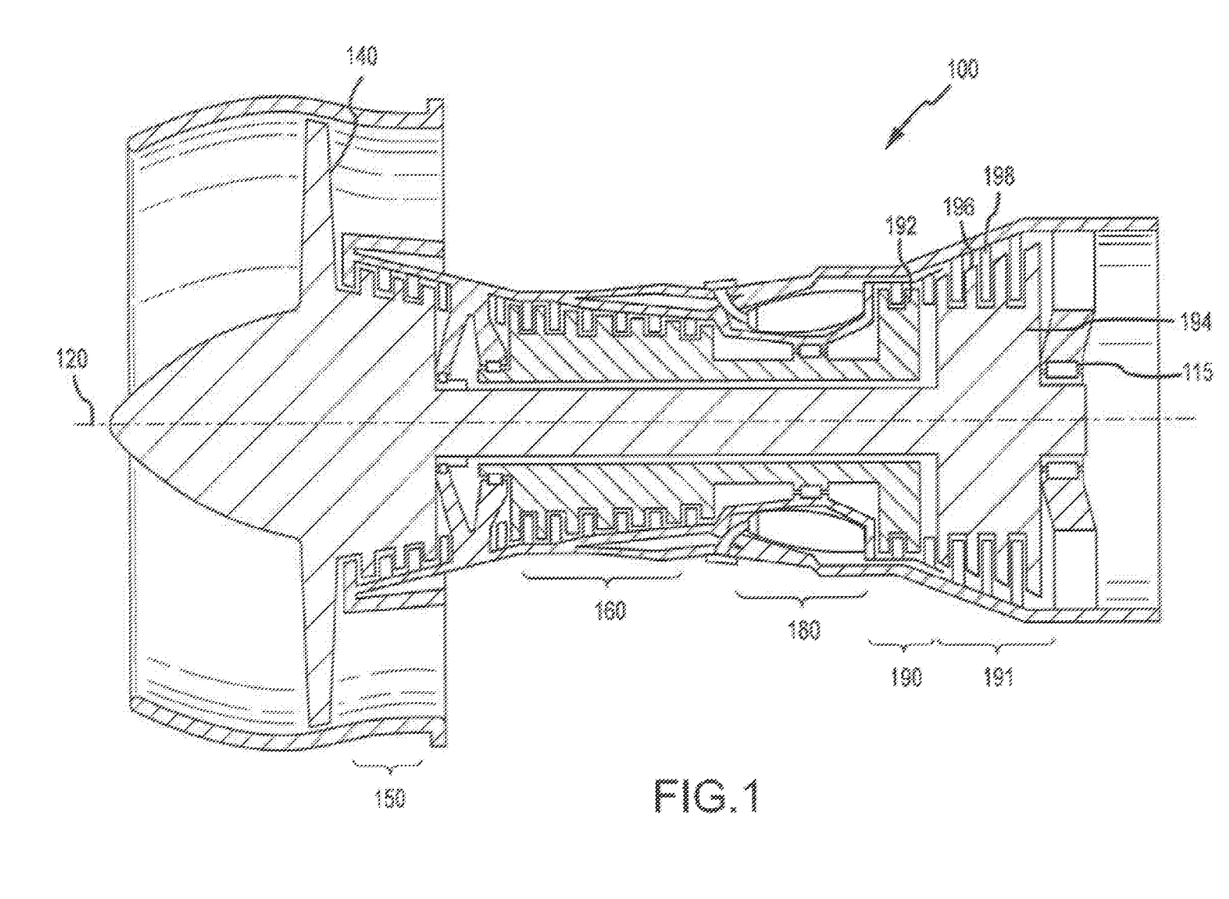
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axis of rotation 120, which may also be referred to as axis of rotation 120. Gas turbine engine 100 may comprise a fan 140, compressor sections 150 and 160, a combustion section 180, and turbine sections 190, 191. Air compressed in the compressor sections 150, 160 may be mixed with fuel and burned in combustion section 180 and expanded across turbine sections 190, 191. Turbine sections 190, 191 may include high pressure rotors 192 and low pressure rotors 194, which rotate in response to the expansion. Turbine sections 190, 191 may comprise alternating rows of rotary airfoils or blades 196 and static airfoils or vanes 198. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2A:
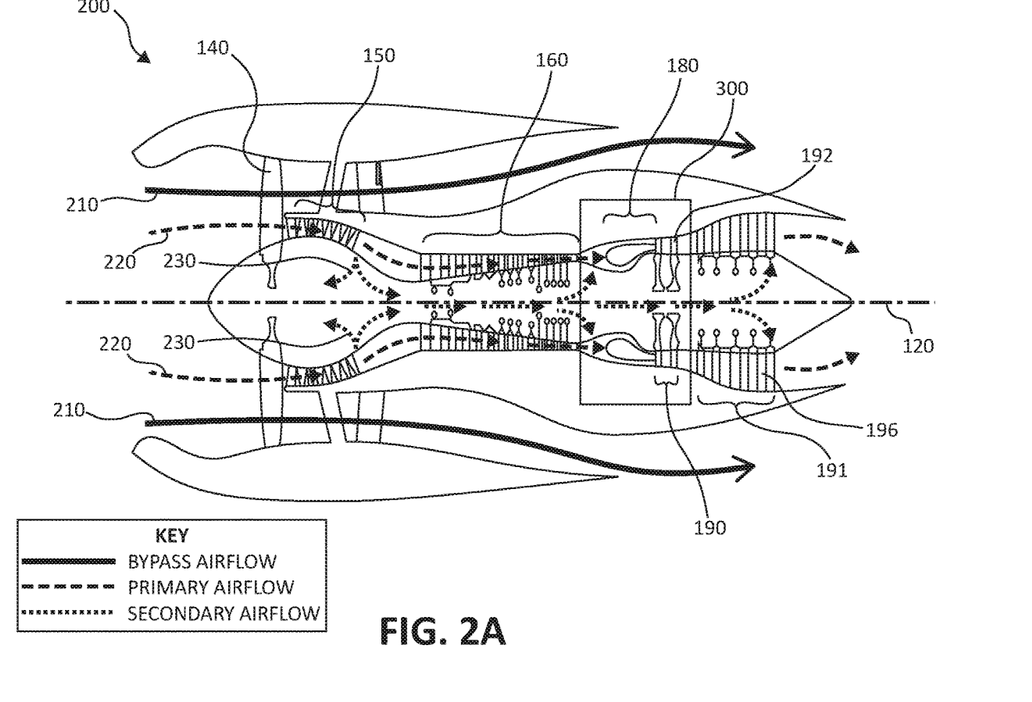
FIG. 2A illustrates a cross-section view of a gas turbine engine showing airflow patterns in accordance with various embodiments.

Referring to FIG. 2A, a gas turbine engine 200 is illustrated according to various embodiments. Elements with the like element numbering as depicted in FIG. 1, are intended to be the same and will not be repeated for the sake of clarity. In various embodiments, during operation of the gas turbine engine 200, airflow that enters the fan 140 may be divided between bypass airflow 210, primary airflow 220, and/or secondary airflow 230. The bypass airflow 210 provides the majority of the thrust produced by the gas turbine engine 200. The primary airflow 220 may be compressed as it travels through the compressor sections 150, 160, and then mixed with fuel and burned in the combustion section 180. The burned mix of air and fuel may then expand across turbine sections 190, 191, turning the turbines and generating additional thrust. The secondary airflow 230 may be any airflow different from the bypass airflow 210 or the primary airflow 220. The secondary airflow 230 may be utilized for multiple purposes including, for example, cooling and pressurization. The secondary airflow 230 may ultimately be at least partially injected into the primary airflow 220 at various points to be used, for example, to cool various components.

Figure 2B:
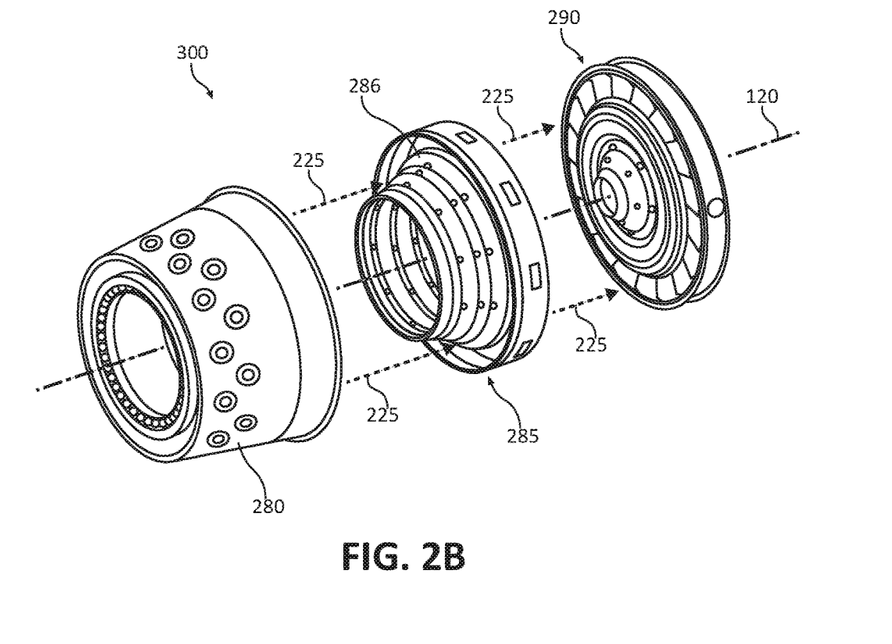
FIG. 2B illustrates an exploded view of a combustor, turbine nozzle, and high pressure turbine of a gas turbine engine in accordance with various embodiments.

Referring to FIG. 2B, a combustor 280, a turbine nozzle 285, and a high pressure turbine 290 are depicted from box 300 in FIG. 2A, in accordance with various embodiments. The combustor 280, the turbine nozzle 285, and the high pressure turbine 290 may be coupled together, and the turbine nozzle 285 may be disposed aft of the combustor 280 and forward of the high pressure turbine 290. With combined reference to FIGS. 2A and 2B, as discussed above, the primary airflow 220 may be mixed with fuel and burned in the combustor 280, and then fed through the turbine nozzle 285 and expanded through the high pressure turbine 290. At this point, the primary airflow 220 may have an extremely high temperature (e.g., 1000° F./537° C. to 2000° F./1093° C. or higher.), and a portion of the secondary airflow 230 may be injected into the primary airflow 220 to cool the turbine nozzle 285, and/or other components.

In various embodiments, the turbine nozzle 285 may comprise a nozzle choke area 286 through which air flows. The nozzle choke area 286 may comprise a nozzle choke radius, which may be a fixed size. The nozzle choke area 286 may be configured to allow a certain fixed amount of nozzle airflow 225 through the turbine nozzle 285 and into the high pressure turbine 290. Therefore, if too much airflow is in the gas turbine engine 200, the turbine nozzle 285 may restrict airflow and may cause the compressor section 160 to exceed its surge margin. A surge may cause airflow to temporarily reverse directions, which may result in problems such as high vibration and changes in thrust. Such problems may result in damage to the gas turbine engine 200.

Figure 3:
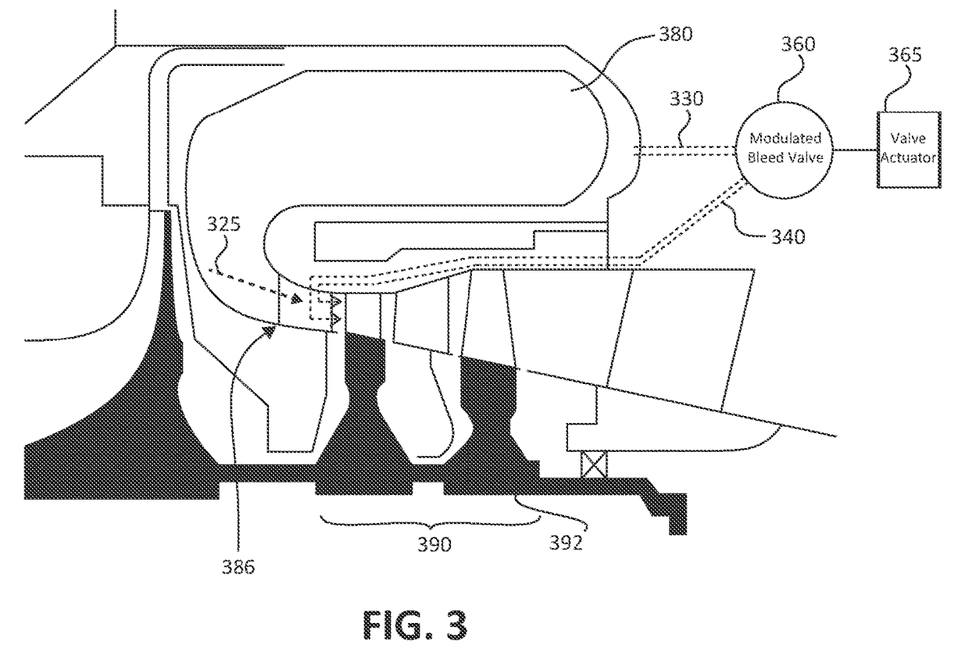
FIG. 3 illustrates a perspective view of a combustor, turbine nozzle, and high pressure turbine of a gas turbine engine in accordance with various embodiments.

With reference to FIGS. 2B and 3, in various embodiments, a gas turbine engine may comprise a modulated bleed valve 360. The modulated bleed valve 360 may be disposed aft of the combustor 380 and aft of the nozzle choke area 386 (286 in FIG. 2). In various embodiments, the modulated bleed valve 360 may comprise a valve actuator 365 configured to completely open, partially open, or completely close the modulated bleed valve 360, during an aircraft flight as commanded by a controller, based on, in various embodiments, the amount of airflow traveling through a gas turbine engine and a desired amount of nozzle airflow 225. Stated another way, the modulated bleed valve 360 may assume a closed configuration, an open configuration (100% open), and/or a partially open configuration (ranging anywhere between 0% open and 100% open) as commanded by a controller. In various embodiments, the closed configuration may comprise the modulated bleed valve 360 being a minimum percent open, which may be set at any desired minimum percent open. For the sake of simplicity, in this disclosure, the minimum percent open for the closed configuration is 0% open. In various embodiments, the valve actuator 365 may cause the modulated bleed valve 360 to become more open or less open, at any time before, during, or after an aircraft flight, to assume the open configuration, a partially open configuration, and/or the closed configuration.

In various embodiments, when the modulated bleed valve is in an open configuration or a partially open configuration, the modulated bleed valve 360 may be configured to reroute secondary airflow 330 to another part of a gas turbine engine. Secondary airflow 330 rerouted by the modulated bleed valve 360 may be referred to as bleed airflow 340. Bleed airflow 340 may be rerouted anywhere in a gas turbine engine. As depicted in FIG. 3, in accordance with various embodiments, the modulated bleed valve 360 may reroute the bleed airflow 340, which may be proximate to the combustor 380 and aft of the nozzle choke area 386, forward in the gas turbine engine, making the bleed airflow 340 join and increase the amount of nozzle airflow 325. The bleed airflow 340 may join the nozzle airflow 325 just after the nozzle airflow 225, 325 has passed through the nozzle choke area 386. Effectively, the modulated bleed valve 360 may be allowing the bleed airflow 340 to bypass the nozzle choke area 386 and join the nozzle airflow 325 just aft of the nozzle choke area 386. In various embodiments, the bleed airflow 340 may join the nozzle airflow 225, 325 and may be used to perform various functions within the gas turbine engine. For example, the bleed airflow 340 and/or the nozzle airflow 225, 325 may be used to cool the turbine nozzle 285 and/or rotate the high pressure turbine 290, 390 by traveling past high pressure rotors 392. In various embodiments, such rerouting of the bleed airflow 340 within the gas turbine engine by the modulated bleed valve 360 may result in few or no audible emissions produced by the modulated bleed valve 360. Therefore, the modulated bleed valve 360 may produce less noise than traditional bleed valves that vent bleed airflow outside of the gas turbine engine and into the atmosphere.

By bypassing the nozzle choke area 386, the modulated bleed valve 360 enables greater control of air flow through the turbine nozzle 285. Stated another way, the modulated bleed valve 360 allows for the increase in airflow through the nozzle choke area 386 above that which would have been fixed by the static nature of nozzle choke area 386. Such an increase in airflow through the nozzle choke area 386 allows more airflow available to perform functions in the engine, as discussed above. The effect of modulated bleed valve 360 is thus as though the cross sectional area, or the nozzle choke radius, of nozzle choke area 386 is of variable size. In response to being in the closed configuration, the modulated bleed valve 360 may prevent secondary airflow 330 from bypassing the nozzle choke area 386, thus allowing no bleed airflow 340. In various embodiments, when the closed configuration is configured to be some minimum percent open other than 0% open, the modulated bleed valve 360 may allow a minimum percent of bleed airflow 340 to bypass the nozzle choke area 386. In various embodiments, the closed configuration (at 0% open) may be configured to allow some predetermined amount of bleed airflow 340 to bypass the nozzle choke area 386.

Figure 4:
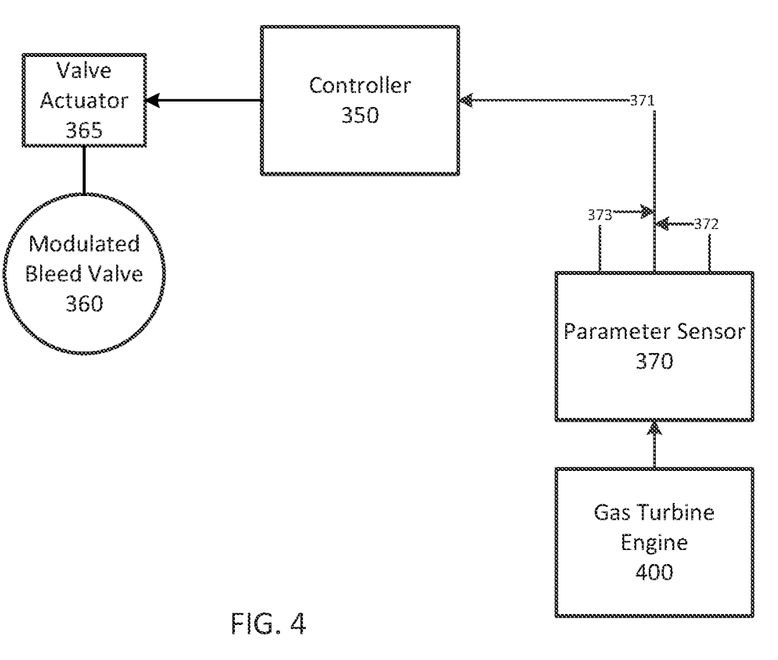
FIG. 4 illustrates a schematic diagram of a system for modulating a bleed valve, in accordance with various embodiments.

Referring to FIG. 4, the modulated bleed valve 360 may be in communication with a controller 350. A controller may comprise a processor configured to implement various logical operations in response to execution of instructions, for example, instructions stored on a tangible, non-transitory computer-readable medium and/or memory configured to communicate with the controller 350. An article of manufacture may also comprise a tangible, non-transitory computer-readable storage medium having instructions stored thereon to be communicated to a controller. The instructions may cause the controller 350 to perform certain operations, as described herein. The controller 350 may receive pluralities of parameter values 371 from a parameter sensor 370, and determine the conditions under which a gas turbine engine 400 is operating.

In various embodiments, the controller 350 may command the modulated bleed valve 360 to open or close from a range of 0% open to 100% open, and thus assume an open configuration (100% open), a partially open configuration (ranging anywhere between 0% open and 100% open), and/or a closed configuration, during, before, or after an aircraft flight based on the desired bleed airflow amount determined by the controller 350. In various embodiments, the valve actuator 365 may receive the command from the controller 350 and, in response, move the modulated bleed valve 360 to the open configuration, a partially open configuration, and/or the closed configuration in response to the controller's 350 command.

Different operating conditions during an aircraft flight may benefit from different amounts of airflow through a gas turbine engine. For example, in transient conditions, such as take-off, climb, descent, and/or landing, more airflow may be desired than in steady state conditions, such as idle or cruise at a constant altitude. Modulating the amount of airflow through the gas turbine engine during different conditions of an aircraft flight may optimize performance of the gas turbine engine during those conditions.

In various embodiments, to determine the conditions and/or parameters under which a gas turbine engine is operating, the gas turbine engine may comprise one or more of a pressure sensor, a temperature sensor, a fuel flow sensor, or any sensor that would measure a parameter value for a given engine component or function. With reference to FIG. 4, the parameter sensor 370 may be any of these parameter sensors, or all these parameter sensors. The parameter sensor 370 may be in communication with the gas turbine engine 400, and may be in communication with the controller 350.

In various embodiments, the modulated bleed valve 360 may open or close, ranging from 0% open to 100% open, depending on the conditions and/or parameters in which a gas turbine engine 400 is operating. When more airflow is desired through the gas turbine engine 400 because it is operating in a transient condition, for example, the modulated bleed valve 360 may open, as commanded by the controller 350, to allow more bleed airflow 340 to bypass the nozzle choke area 386 (or 286 in FIG. 2). If less airflow through the gas turbine engine 400 is required for a lower power state, such as cruise or idle, the modulated bleed valve 360 may assume a partially open configuration that is less open than a previous configuration, or the closed configuration, as commanded by the controller 350. Therefore, the modulated bleed valve 360 may optimize operability and performance of the gas turbine engine 400 during various aircraft flight conditions by providing the specific amount of airflow desired by the gas turbine engine 400 during each flight condition.

Returning to FIG. 4, in various embodiments, the controller 350 may try to keep the gas turbine engine 400 functioning at a certain level, such as optimum efficiency. In order to maintain a certain level of gas turbine engine operation, based on the plurality of parameters values 371 received by the controller 350, the controller 350 may determine a desired bleed airflow that should be allowed through the modulated bleed valve 360. For example, a modulated bleed valve 360 may be implemented to minimize the surge margin excursion during a transient (acceleration, deceleration, and/or the like) operation of an engine. In a transient condition such as load-on for auxiliary power units (APUs) or take-off for propulsion engines, there may be a difference between the target engine speed and the actual engine speed, and the gas turbine engine 400 may need to accelerate under such a condition. Therefore, the controller 350 may recognize the transient condition under which the gas turbine engine 400 is operating, may recognize that a change in the gas turbine engine 400 operation is desired (acceleration in the case of take-off), may recognize that airflow through the gas turbine engine 400 may benefit from adjustment to achieve such a desired change in the engine operation, and may determine a desired amount of bleed airflow 340 to achieve the desired increased or decreased airflow through the gas turbine engine 400. The controller 350 may then command the modulated bleed valve 360 to open or close, partially or completely, i.e., assume an open configuration (100% open), a partially open configuration (anywhere between 0% open and 100% open), or a closed configuration, to achieve the desired amount of bleed airflow 340 under certain flight conditions. The valve actuator 365 may receive the command from the controller 350 and may open or close the modulated bleed valve 360 accordingly.

In various embodiments, the controller 350 may receive pluralities of parameter values 371 from the parameter sensor 370, determine a desired bleed airflow amount, and command the modulated bleed valve 360 to assume an open configuration (100% open), a partially open configuration (anywhere between 0% open and 100% open), or a closed configuration, to achieve the desired bleed airflow at different times throughout an aircraft flight. Therefore, the modulated bleed valve 360 may open or close to varying degrees multiple times during an aircraft flight.

As an illustrative example, the controller 350 may operate at a first time and a second time during an aircraft flight. Referring to FIGS. 2B, 3, and 4, at the first time, the controller 350 may receive a first plurality of parameter values 372 from the parameter sensor 370, which may indicate the conditions under which the gas turbine engine 400 is commanded to operate at the first time. Based on the first plurality of parameter values 372, the controller 350 may determine a first desired bleed airflow to flow through the modulated bleed valve. For example, if the parameters at the first time indicate to the controller 350 that the gas turbine engine 400 is operating under a transient condition, the controller 350 may determine that more bleed airflow 340 is desired. The first desired bleed airflow may be more or less than a desired bleed airflow for a previous time in the aircraft flight. The controller 350 may command the modulated bleed valve 360 to assume an open configuration, a first partially open configuration, or a closed configuration in response to the determination of the first desired bleed airflow. The open configuration may comprise the modulated bleed valve 360 being 100% open. The closed configuration may comprise the modulated bleed valve 360 being 0% open, or some minimum percent open. The first partially open configuration may comprise the modulated bleed valve 360 being partially open (anywhere between 0% open and 100% open). In various embodiments, the first partially open configuration may comprise the modulated bleed valve 360 being more or less open than a previous open configuration assumed by the modulated bleed valve 360 during an aircraft flight. The closed configuration may prevent any bleed airflow 340 from passing through the turbine nozzle 285. In various embodiments, the closed configuration may allow some predetermined amount of bleed airflow 340 through the turbine nozzle 285. For the transient condition determined by the controller 350 in the example above, the controller 350 may command the modulated bleed valve 360 to assume the open configuration or a first partially open configuration that is more open than a previous partially open configuration and/or the closed configuration.

At the second time, the controller 350 may receive a second plurality of parameter values 373 from the parameter sensor 370, which may indicate the conditions under which the gas turbine engine 400 is commanded to operate at the second time. Based on the second plurality of parameter values 373, the controller 350 may determine a second desired bleed airflow to flow through the modulated bleed valve. The second desired bleed airflow may be more or less than the first desired airflow. For example, if the parameters at the second time indicate to the controller 350 that the gas turbine engine 400 is no longer operating under a transient condition, the controller 350 may determine that less bleed airflow 340 is desired. The controller 350 may command the modulated bleed valve 360 to assume the open configuration, a second partially open configuration (ranging anywhere between 0% open to 100% open), or the closed configuration in response to the determination of the second desired bleed airflow. For example above, the controller 350 may command the modulated bleed valve 360 to close partially or completely, which may result in the modulated bleed valve 360 assuming a second partially open configuration that is less open than the first partially open configuration, or it may result in the modulated bleed valve 360 assuming the closed configuration. In various embodiments, the second partially open configuration may comprise the modulated bleed valve 360 being partially or completely open. The second partially open configuration may comprise the modulated bleed valve 360 being more or less open than the first partially open configuration, or more or less open than a previous partially open configuration assumed by the modulated bleed valve 360 during an aircraft flight. Opening or closing the modulated bleed valve 360 may increase or decrease, respectively, the amount of bleed airflow 340 that bypasses the turbine nozzle choke area 386 and rerouted to join the nozzle air flow 325 at a point aft of the nozzle choke area 386.

In various embodiments, tailoring the amount of bleed airflow 340 allowed through the modulated bleed valve 360 to match desired airflow amounts for various flight conditions over an aircraft flight may optimize the operability and performance of a gas turbine engine throughout an aircraft flight.

Figure 5:
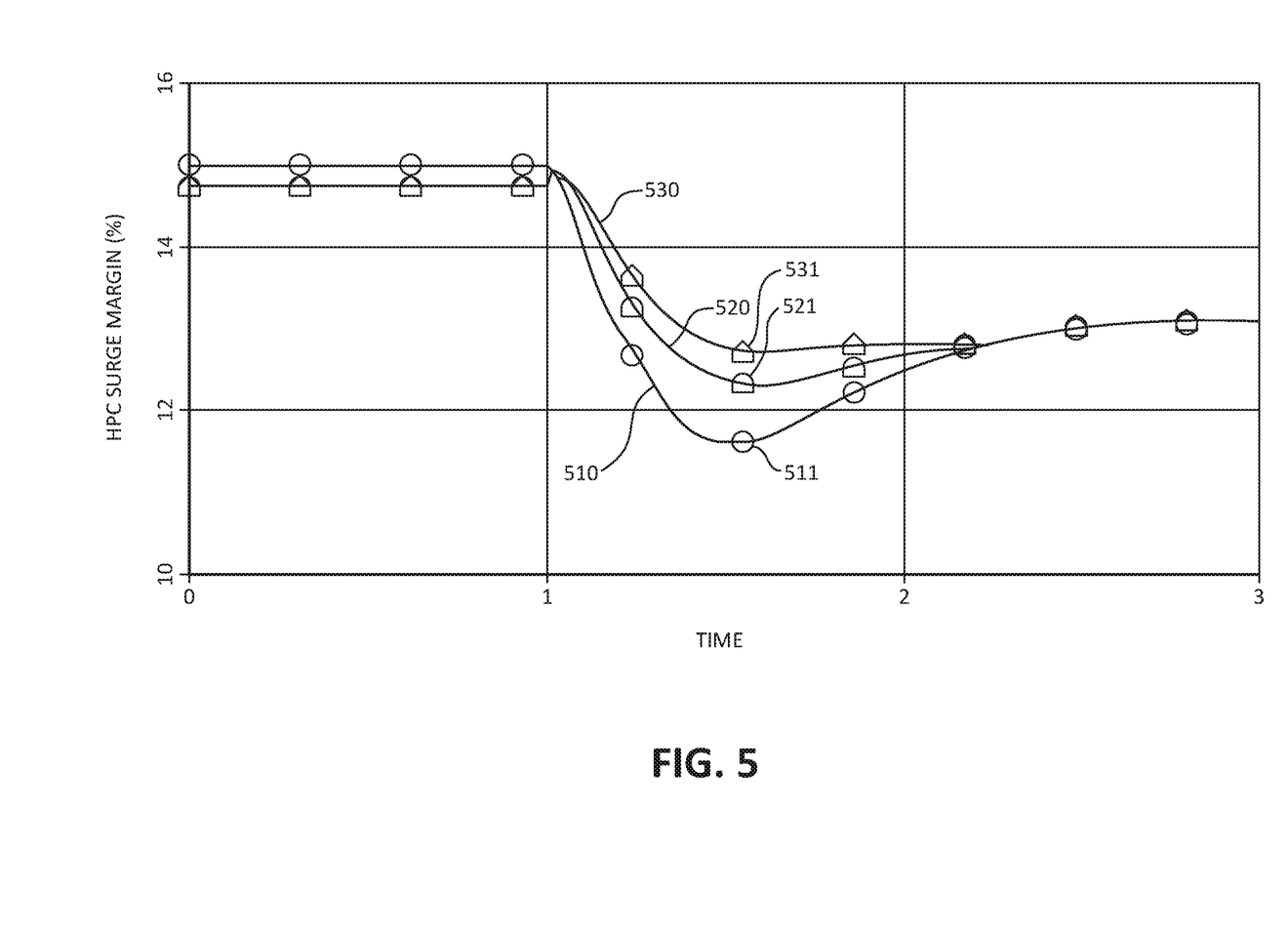
FIG. 5 illustrates a graphical depiction of an auxiliary power unit simulation transient surge margin, in accordance with various embodiments.

Returning to FIG. 2A, increased airflow capabilities through the gas turbine engine 200 may increase the surge margins of compressor sections 150, 160. By increasing the surge margins of the compressor sections 150, 160, the gas turbine engine 200 may have increased operability under transient conditions, which may require more airflow through the gas turbine engine. FIG. 5 depicts, in accordance with various embodiments, an exemplary graphic representation of an auxiliary power unit simulation with various amounts of bleed airflow 340 during a transient operation in a gas turbine engine. The x-axis shows time, from time unit zero to time unit 3, and the y-axis shows the high pressure compressor (HPC) surge margin (percent). From time zero to time 1, along the x-axis, the gas turbine engine may be operating in steady state with no load, meaning the gas turbine engine is at zero percent power. From time 1 to about time 2.4 along the x-axis, wherein the term "about" in this context only refers to plus or minus 0.2 time units, the gas turbine engine may be operating at increasing power percentages during a transient power request, such as load-on or take-off. Time after 2.4 along the x-axis may be the gas turbine engine operating at 100% power in a steady state. With combined reference to FIG. 3, the baseline plot 510 depicts the surge margin for a gas turbine engine with no bleed airflow 340 bypassing the nozzle choke area 386 to join the nozzle airflow 325. The HPC surge margin excursion at the midpoint 511 is at a level of approximately 11.6 percent. Plot 520 depicts the surge margin for a gas turbine engine with the nozzle airflow 325 being increased 3 percent during the transient excursion by the addition of bleed airflow 340 bypassing the nozzle choke area 386 through the modulated bleed valve 360. The HPC surge margin at transient excursion midpoint 521 is at a level of approximately 12.4 percent. Therefore, with the nozzle airflow 325 increasing by 3 percent by the addition of the bleed airflow 340 from the modulated bleed valve 360, the HPC surge margin increased by about 0.8 percent, wherein the term "about" in this context only refers to plus or minus 0.2 percent, which is a proportional increase of greater than 5% from the baseline plot transient excursion midpoint 511. Plot 530 depicts the surge margin for a gas turbine engine with the nozzle airflow 325 being increased 5 percent during the transient excursion by the addition of bleed airflow 340 bypassing the nozzle choke area 386 through the modulated bleed valve 360. The HPC surge margin at transient excursion midpoint 531 is at a level of approximately 12.7 percent. Therefore, with the nozzle airflow 325 increasing by 5 percent with the addition of the bleed airflow 340 from the modulated bleed valve 360, the HPC surge margin increased by about 1.1 percent, wherein the term "about" in this context only refers to plus or minus 0.2 percent, which is a proportional increase of greater than 8% from the baseline plot transient excursion midpoint 511.

As indicated by the increases in the HPC surge margins as the nozzle airflow 325 is increased by bleed airflow 340 being added to it through the modulated bleed valve 360, an increased nozzle airflow 325 increases a gas turbine engine's operability. Such increases in the HPC surge margins allow the gas turbine engine to operate at higher power levels during transient excursions with less risk of a surge occurring.

In various embodiments, varying the amount of bleed airflow 340 allowed through the modulated bleed valve 360 may also improve the performance of a gas turbine engine. Different amounts of airflow are required for maximum efficiency under different operating conditions of a gas turbine engine. For example, a gas turbine engine may be designed to perform most efficiently under high power conditions. Because high power conditions are associated with more airflow, such an engine may comprise a large nozzle choke radius in the nozzle choke area, which provides a greater surge margin. In such a case however, at idle or low power, the gas turbine engine may operate with low efficiency, because the engine's operating line at low power will be much lower than the surge margin (the closer the operating line is to the surge margin, the more efficiently the gas turbine engine is operating in any given condition). The efficiency at idle or low power may be increased if, with reference to FIG. 2B, the turbine nozzle 285 comprises a choke area 286 with a smaller nozzle choke radius. That way, more air pressure will exist within the gas turbine engine at lower power because less nozzle airflow 225 may be allowed through the turbine nozzle 285. This may cause the gas turbine engine operating line at idle or low power to rise closer to its surge margin, increasing engine efficiency.

A modulated bleed valve may open or close to any degree in order to provide the optimal amount of airflow required by any engine power level to maximize engine efficiency and performance. For example, with a small nozzle choke radius, which is a fixed size, a gas turbine engine may perform efficiently at low power, as discussed above. However, in order for the gas turbine engine to operate at high power conditions without creating a surge, more air would bypass the nozzle choke area 286 (or 386 in FIG. 3). The modulated bleed valve 360 may accomplish this by opening and allowing more bleed airflow 340 to bypass the nozzle choke area 286, 386, thus adding more bleed airflow 340 to the nozzle airflow 225, 235. This redirecting of airflow may allow a gas turbine engine with a small nozzle choke radius to perform efficiently at higher power levels as if it comprised a larger nozzle choke radius. Effectively, the modulated bleed valve 360 may make it as if the gas turbine engine may vary the size of its nozzle choke radius. The modulated bleed valve 360 may open (or close) in response to a command from the controller 350, which determines the conditions under which the engine is operating (and whether a higher or lower engine power level is needed). Thus, the modulated bleed valve 360 may increase overall engine performance.

Figure 6:
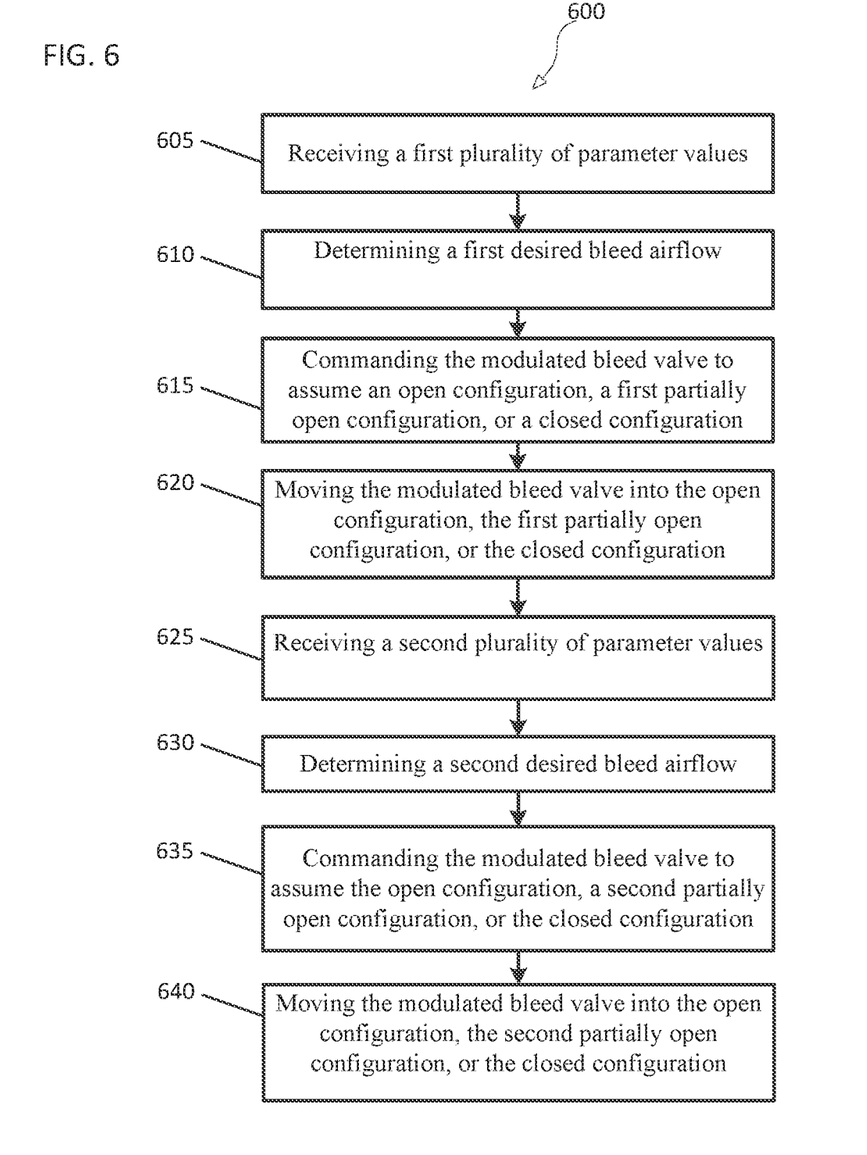
FIG. 6 illustrates a method of varying bleed airflow in a gas turbine engine, in accordance with various embodiments.

A block diagram illustrating a method of varying bleed airflow in a gas turbine engine 600 is depicted in FIG. 6, in accordance with various embodiments. With combined reference to FIGS. 2B, 3, and 4, all steps in the method may be performed by the controller 350. Receiving a first plurality of parameter values 605 may comprise the controller 350 being in communication with a parameter sensor 370, which is in communication with a gas turbine engine 400, and receiving a first plurality of parameter values 372 from the parameter sensor 370 at a first time. The first plurality of parameter values 372 may indicate the conditions under which the gas turbine engine 400 is operating at the first time. Determining a first desired bleed airflow 610 may comprise the controller 350 recognizing the conditions under which the gas turbine engine 400 is operating (transient or steady-state, for example). Based on the conditions under which the gas turbine engine 400 is operating, the controller 350 may recognize a desire for a change in the gas turbine engine 400 operation (acceleration in the case of take-off, for example). The controller may determine that there should be an adjustment of airflow through the gas turbine engine 400 to achieve such a change in the engine operation. Accordingly, the controller 350 may determine a first desired bleed airflow amount to achieve the desired adjustment in airflow through the gas turbine engine 400. Commanding the modulated bleed valve to assume an open configuration, a first partially open configuration, or a closed configuration 615 may comprise the controller 350 being in communication with the modulated bleed valve 360. The controller 350 may command the modulated bleed valve 360 to open, partially or completely, or close to assume to the open configuration (100% open), the first partially open configuration (ranging anywhere between 0% open and 100% open), or the closed configuration to achieve the first desired bleed airflow. When in the open configuration and/or the first partially open configuration, the modulated bleed valve 360 may reroute the bleed airflow 340 forward to join the nozzle airflow 325 aft of the nozzle choke area 386. Moving the modulated bleed valve into the open configuration, the first partially open configuration, or the closed configuration 620 may comprise the valve actuator 365 opening or closing the modulated bleed valve 360 to a degree in response to the command from the controller 350.

Receiving a second plurality of parameter values 625 may comprise the controller 350 receiving a second plurality of parameter values 373 from the parameter sensor 370 at a second time. The second plurality of parameter values 373 may indicate the conditions under which the gas turbine engine 400 is operating at the second time. At the second time, the gas turbine engine 400 may be operating under different flight conditions than at the first time. Determining a second desired bleed airflow 630 may comprise the controller 350 recognizing the conditions under which the gas turbine engine 400 is operating, and based on those conditions, the controller 350 may recognize a desired adjustment in the gas turbine engine 400 operation. The controller may determine that there should be an adjustment of airflow through the gas turbine engine 400 to achieve the desired change in the engine operation. Accordingly, the controller 350 may determine a second desired bleed airflow amount to achieve the desired adjustment in airflow through the gas turbine engine 400. Commanding the modulated bleed valve 360 to assume the open configuration, a second partially open configuration, or the closed configuration 635 may comprise the controller 350 commanding the modulated bleed valve 360 to open, partially or completely, or close to assume to the open configuration, the second partially open configuration (ranging anywhere between 0% open and 100% open), or the closed configuration to achieve the first desired bleed airflow. When in the open configuration and/or the second partially open configuration, the modulated bleed valve 360 may reroute the bleed airflow 340 forward to join the nozzle airflow 325 aft of the nozzle choke area 386. Moving the modulated bleed valve into the open configuration, the second partially open configuration, or the closed configuration 640 may comprise the valve actuator 365 opening or closing the modulated bleed valve 360 to a degree in response to the command from the controller 350. When in the open configuration, first partially open configuration, or second partially open configuration, the modulated bleed valve 360 may reroute bleed airflow 340 forward to join the nozzle airflow 325 aft of the nozzle choke area 386. The nozzle airflow 325 with the bleed airflow 340 may be used to perform various functions within the gas turbine engine such as cooling the turbine nozzle 285 and/or rotating the high pressure turbine 390.

Although described primarily herein as being located aft of the combustor 380, the modulated bleed valve 360 may be located at any position in a gas turbine engine such that the modulated bleed valve 360 may reroute airflow. Also, the modulated bleed valve 360 may reroute airflow to any portion of the gas turbine engine without going outside the scope of this disclosure. For example, referring to FIG. 3, the modulated bleed valve 360 may redirect secondary airflow 330 somewhere other than aft of the nozzle choke area 386.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine, comprising:
   a turbine section comprising alternating rows of rotary airfoils and static vanes, the turbine section including a high pressure turbine;
   a combustor;
   a turbine nozzle coupled to the combustor and disposed forward of the high pressure turbine, the turbine nozzle comprising a nozzle choke area; and
   a modulated bleed valve in communication with a controller, wherein:
      the modulated bleed valve disposed aft of the nozzle choke area;
      the modulated bleed valve is configured to assume, in response to a command by the controller, at least one of an open configuration, a closed configuration, or a partially open configuration ranging between the open configuration and the closed configuration, and when in at least one of the open configuration or the partially open configuration, the modulated bleed valve allows a bleed airflow through the turbine nozzle aft of the nozzle choke area and reroutes the bleed airflow forward to join a nozzle airflow at a point aft of the nozzle choke area and forward of the high pressure turbine; and the bleed airflow is configured to cool the turbine nozzle and rotate the high pressure turbine.

2. The gas turbine engine of claim 1, wherein the modulated bleed valve comprises a valve actuator configured to move the modulated bleed valve into at least one of the open configuration, the partially open configuration, or the closed configuration in response to the command by the controller.

3. The gas turbine engine of claim 1, wherein the modulated bleed valve, when in at least one of the open configuration or the partially open configuration, increases the nozzle airflow by 3% to 5% by adding the bleed airflow.

4. The gas turbine engine of claim 3, wherein a high pressure compressor surge margin increases by greater than 5% from a baseline value.

5. The gas turbine engine of claim 1, further comprising a tangible, non-transitory memory configured to communicate with the controller, the tangible, non-transitory memory having instructions stored thereon that, in response to execution by the controller, cause the controller to perform operations, comprising:
  receiving, by the controller, a first plurality of parameter values from a plurality of parameter sensors under which the gas turbine engine is commanded to operate at a first time;
  determining, by the controller, a first desired bleed airflow to flow through the modulated bleed valve in response to the first plurality of parameter values;
  commanding, by the controller, the modulated bleed valve to assume at least one of the open configuration, the partially open configuration ranging between the open configuration and the closed configuration, or the closed configuration in response to the determining the first desired bleed airflow.

6. A method of varying bleed airflow in a gas turbine engine, comprising:
  receiving, by a controller, a first plurality of parameter values from a plurality of parameter sensors under which the gas turbine engine is commanded to operate at a first time;
  determining, by the controller, a first desired bleed airflow through a modulated bleed valve in response to the first plurality of parameter values;
  commanding, by the controller, the modulated bleed valve to assume at least one of an open configuration, a closed configuration, or a first partially open configuration ranging between the open configuration and the closed configuration in response to the first desired bleed airflow, wherein, when in at least one of the open configuration or the first partially open configuration, the modulated bleed valve reroutes a bleed airflow forward of the modulated bleed valve to join a nozzle airflow aft of a nozzle choke area and forward of a high pressure turbine, the modulated bleed valve being disposed aft of the nozzle choke area; and
  wherein the bleed airflow is used to cool a turbine nozzle and rotate the high pressure turbine.

7. The method of claim 6, further comprising moving, by a valve actuator, the modulated bleed valve into at least one of the open configuration, the first partially open configuration, or the closed configuration.

8. An article of manufacture including a tangible, non-transitory computer-readable storage medium configured to communicate with a controller, the tangible, non-transitory computer-readable medium having instructions stored thereon that, in response to execution by the controller, cause the controller to perform operations, comprising:
  receiving, by the controller, a first plurality of parameter values from a plurality of parameter sensors under which a gas turbine engine is commanded to operate at a first time;
  determining, by the controller, a first desired bleed airflow through a modulated bleed valve in response to the first plurality of parameter values;
  commanding, by the controller, the modulated bleed valve to assume at least one of an open configuration, or a closed configuration, a first partially open configuration ranging between the open configuration and the closed configuration in response to the first desired bleed airflow, wherein, when in at least one of the open configuration or the first partially open configuration, the modulated bleed valve reroutes a bleed airflow forward of the modulated bleed valve to join a nozzle airflow aft of a nozzle choke area and forward of a high pressure turbine, the modulated bleed valve being disposed aft of the nozzle choke area; and
  wherein the bleed airflow is used to cool a turbine nozzle and rotate the high pressure turbine.

\* \* \* \* \*